US009374642B2

(12) United States Patent
Jing et al.

(10) Patent No.: US 9,374,642 B2
(45) Date of Patent: Jun. 21, 2016

(54) MULTIPURPOSE CONNECTOR FOR MULTIPLEXING HEADSET INTERFACE INTO HIGH-DEFINITION VIDEO AND AUDIO INTERFACE, AND HANDHELD ELECTRONIC DEVICE

(71) Applicant: Huawei Device Co., Ltd., Shenzhen (CN)

(72) Inventors: Fenghua Jing, Shenzhen (CN); Dongyi Zhu, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 169 days.

(21) Appl. No.: 14/141,124

(22) Filed: Dec. 26, 2013

(65) Prior Publication Data

US 2014/0105432 A1 Apr. 17, 2014

Related U.S. Application Data

(63) Continuation of application No. PCT/CN2011/081069, filed on Oct. 20, 2011.

(51) Int. Cl.

| | |
|---|---|
| ***H04R 5/033*** | (2006.01) |
| ***H04R 5/04*** | (2006.01) |
| *H04M 1/02* | (2006.01) |
| *H04M 1/60* | (2006.01) |

(52) U.S. Cl.

CPC .................. *H04R 5/033* (2013.01); *H04R 5/04* (2013.01); *H04M 1/0274* (2013.01); *H04M 1/6058* (2013.01); *H04R 2420/03* (2013.01); *H04R 2420/05* (2013.01); *H04R 2420/09* (2013.01)

(58) Field of Classification Search

None

See application file for complete search history.

(56) References Cited

U.S. PATENT DOCUMENTS

| | | | | |
|---|---|---|---|---|
| 8,064,613 | B1 * | 11/2011 | Helfrich | 381/74 |
| 8,625,029 | B2 * | 1/2014 | Doyle et al. | 348/553 |
| 2008/0164994 | A1 * | 7/2008 | Johnson et al. | 340/533 |
| 2009/0118582 | A1 | 5/2009 | Tsumaru et al. | |
| 2009/0248924 | A1 * | 10/2009 | Melin | 710/63 |
| 2010/0109795 | A1 * | 5/2010 | Jones et al. | 333/101 |

(Continued)

FOREIGN PATENT DOCUMENTS

| | | | |
|---|---|---|---|
| CN | 201114493 | Y | 9/2008 |
| CN | 101282413 | A | 10/2008 |

(Continued)

*Primary Examiner* — Curtis Kuntz
*Assistant Examiner* — Kenny Truong
(74) *Attorney, Agent, or Firm* — Slater Matsil, LLP

(57) ABSTRACT

The present invention provides a multipurpose connector for multiplexing a headset interface into a high-definition video/audio input interface and a handheld device including the multipurpose connector. The multipurpose connector includes a headset connector, a selecting switch, a high-definition video/audio transceiver, and an audio output module. The headset connector includes a first audio terminal and a second audio terminal. The audio output module is configured to output an audio signal of the headset. The selecting switch includes first and second lines. When the selecting switch communicates with the first line, the first audio terminal and the second audio terminal are coupled to a pair of differential transmission lines respectively, and the pair of differential transmission lines is configured to transmit high-definition video/audio data output by the high-definition video/audio transceiver. When the selecting switch communicates with the second line, the first audio terminal is coupled to the audio output module.

22 Claims, 10 Drawing Sheets

(56) References Cited

U.S. PATENT DOCUMENTS

| | | | | |
|---|---|---|---|---|
| 2012/0203937 | A1* | 8/2012 | Mohanty | G06F 13/385 710/16 |
| 2012/0265911 | A1* | 10/2012 | Connolly | 710/300 |

FOREIGN PATENT DOCUMENTS

| | | | |
|---|---|---|---|
| CN | 201204638 | Y | 3/2009 |
| CN | 101442640 | A | 5/2009 |
| CN | 101841586 | A | 9/2010 |
| CN | 101951421 | A | 1/2011 |
| CN | 102203851 | A | 9/2011 |
| GB | 2360161 | A | 9/2001 |
| JP | 2000032339 | A | 1/2000 |
| JP | 2001313697 | A | 11/2001 |
| JP | 2005123672 | A | 5/2005 |
| JP | 2011524096 | A | 8/2011 |
| JP | 2012507947 | A | 3/2012 |
| WO | 0165827 | A2 | 9/2001 |
| WO | 2006045617 | A2 | 5/2006 |
| WO | 2009118582 | A1 | 10/2009 |
| WO | 2010051281 | A2 | 5/2010 |

* cited by examiner

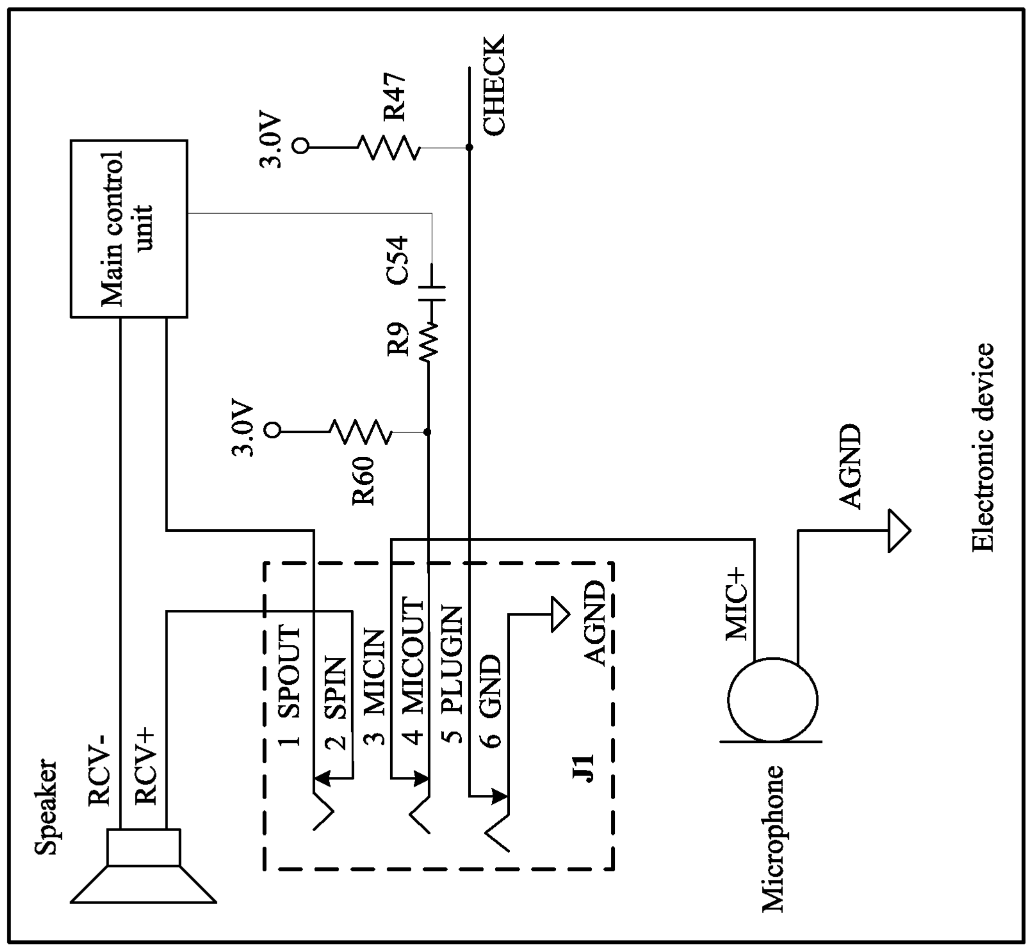
FIG. 7
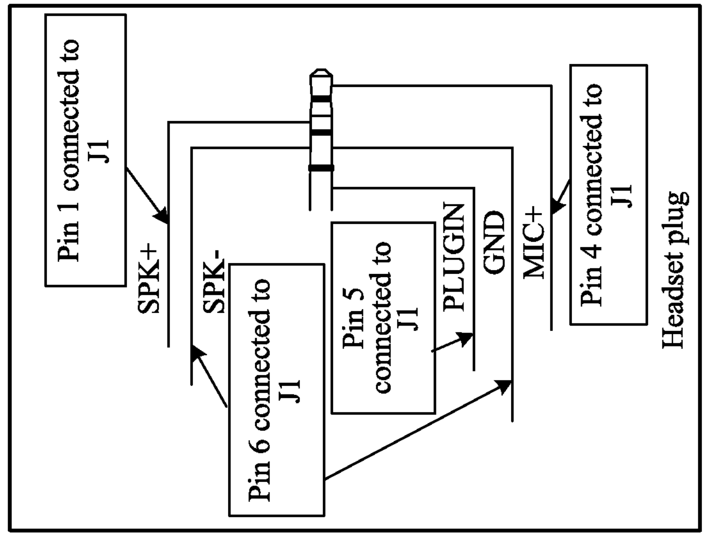

MULTIPURPOSE CONNECTOR FOR MULTIPLEXING HEADSET INTERFACE INTO HIGH-DEFINITION VIDEO AND AUDIO INTERFACE, AND HANDHELD ELECTRONIC DEVICE

This application is a continuation of International Application No. PCT/CN2011/081069, filed on Oct. 20, 2011, which is 418 hereby incorporated by reference in its entirety.

TECHNICAL FIELD

The present invention relates to the field of communications technologies, and in particular, to a service quality configuration method, apparatus and system.

BACKGROUND

Currently, handheld electronic devices such as smart phones and tablet PCs usually have high definition (HD) video recording capabilities, and currently, many high-end smart phones have already been capable of recording smooth high-definition videos with a resolution of 1080p. Furthermore, since high-definition videos are becoming more and more popular, a large amount of high-definition videos are stored on many handheld electronic devices. However, since screens of the handheld electronic devices are small, advantages of high definition cannot be displayed when high-definition videos are played on the handheld electronic devices. Therefore, consumers are urgent to need a method for outputting high-definition videos into large screen display devices such as a television set, a projector, and a computer (PC).

A high-definition multimedia interface (HDMI) is an interface for transmitting uncompressed digital high-definition video/audio, and is forward and backward compatible with a digital video interface (DVI). The DVI only transmits video data, while the HDMI inserts multichannel audio data and status data in the intervals of bursts of video data of DVI. In data transmission, the HDMI uses the transition minimized differential signaling (TMDS) technology. The TMDS technology is a technology for transmitting signals by using a voltage difference between two pins (that is, differential transmission). The TMDS has four channels, in which the first three lines are transmission lines of YU (Pb) V (Pr) or seen as RGB transmission lines, and the fourth line a line for clock, so as to ensure a unified time sequence required in transmission. In general, the four lines are called a connection or a single-link. The maximum transmission rate per channel is 165 MHz (4.95 Gb/s), and a connection provides a transmission rate of 5 Gbps. After the MDS decoding, original data is encrypted based on high definition content protection (HDCP). In addition, 8b/10b differential signals are used to reduce EMI and increase accurate signal transmission rate, and 8-bit input signals are converted into 10-bit codes. Connectors of the HDMI interface have three physical specifications which are called Type A, Type B, and Type C respectively. Type A includes 19 pins, and definitions of each pin are shown in FIG. 1. As seen, six pins in total are used to transmit TMDS data and the six pins are connected to three pairs of differential transmission lines, and two pins are used to transmit TMDS clock signals; in addition, there are pins for power supply, shielding, grounding, control signal and so on. A Type A socket has a maximum width of 14 mm, and a height of 4.55 mm. The Type B has 29 pins, and the size is great. Similar to the Type A, a Type C has 19 pins and the only difference is the size. The size of a Type C socket is 10.5 mm×2.5 mm.

Obviously, the size of the Type A is too great for handheld electronic devices, and the Type C is suitable for handheld mobile devices. However, 19 pins are disposed in a small size of the Type C, which has a much higher requirements on the accuracy for manufacturing an interface, increases manufacturing costs, and reduces the reliability of the interfaces due to high-density wiring. In fact, the number of pluggable times of a Type C HDMI connector is much smaller than that of other connectors with a similar size, for example, a micro universal serial bus (Micro USB) connector.

Furthermore, since the size of handheld electronic devices themselves is small, if more interfaces are added, the space is occupied in one aspect and the manufacturing cost is also increased in another aspect.

SUMMARY OF THE INVENTION

The technical problem to be solved in the present invention is to achieve a small-sized high-definition video interface on a handheld electronic device, and meanwhile do not increase the number of interfaces of the electronic device.

An embodiment of the present invention provides a multipurpose connector for multiplexing a headset interface into a high-definition video/audio interface. The multipurpose connector includes a headset connector, a selecting switch, a high-definition video/audio transceiver, and an audio output module. The headset connector includes a first audio terminal and a second audio terminal. The audio output module is configured to output an audio signal of the headset. The selecting switch includes a first line and a second line. When the selecting switch communicates with the first line, the first audio terminal and the second audio terminal are coupled to a pair of differential transmission lines respectively. The differential transmission lines are configured to transmit high-definition video/audio data output by the high-definition video/audio transceiver. When the selecting switch communicates with the second line, the first audio terminal is coupled to the audio output module.

Another embodiment of the present invention provides a handheld electronic device including a multipurpose connector and a main control unit. The multipurpose connector includes a headset connector, a selecting switch, a high-definition video/audio transceiver, and an audio output module. The headset connector includes a first audio terminal, a second audio terminal, and a grounding terminal. The audio output module is configured to output an audio signal of the headset. The selecting switch includes a first line and a second line. When the selecting switch communicates with the first line, the first audio terminal and the second audio terminal are coupled to a pair of differential transmission lines respectively. The differential transmission lines are configured to transmit high-definition video/audio data output by the high-definition video/audio transceiver. When the selecting switch communicates with the second line, the first audio terminal is coupled to the audio output module. The main control unit is coupled to the high-definition video/audio transceiver and the audio output module respectively.

By using the multipurpose connector and the handheld electronic device provided in the embodiments of the present invention, a headset interface may be multiplexed into a high-definition video/audio interface and may transmit high-definition video and audio. Since a size of the headset is small and is equipped on most of the handheld electronic devices, a high-definition video/audio interface is achieved on a small size of a handheld electronic device and meanwhile the number of interfaces of the handheld electronic device is not increased.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. In the accompanying drawings, when a circuit is involved, if there is no dot at a cross of lines, it indicates that these lines are not connected electrically, and if there is a dot at a cross of lines, it indicates that these lines are connected electrically.

FIG. 7 is a circuit principle diagram of a method for detecting insertion in a headset jack;

DETAILED DESCRIPTION OF ILLUSTRATIVE EMBODIMENTS

Specific embodiments of the present invention are described in detail with reference to accompanying drawings in the following. First of all, the wording and terms used in the various embodiments are explained in the following.

A "handheld electronic device" refers to all kinds of electronic devices which are suitable for being carried by a hand in size, including but not limited to a mobile phone, a personal digital assistant (PDA), a tablet PC, a digital camera, a digital video camera, and an MP3/MP4 player.

A "connector" refers to a component used to connect two devices, which usually includes a socket or a plug and may further include an interface device coupled to the socket or the plug. The connector may be an independent component or may be integrated on a handheld electronic device.

When "A is coupled to B" is mentioned in the following embodiments, a confirmed physical association occurs between an electrical signal passing through A and an electrical signal passing through B, which includes a direct connection through a piece of wire or others between A and B, or an indirect connection through another component C, or an association in which electrical signals of A and B are associated through electromagnetic induction like a transformer.

When ordinal numbers such as "first" and "second" are mentioned in the present invention, it should be understood that the ordinal numbers are just used for a differential purpose except that the ordinal numbers actually indicate a sequence according to the context.

Figure 1:
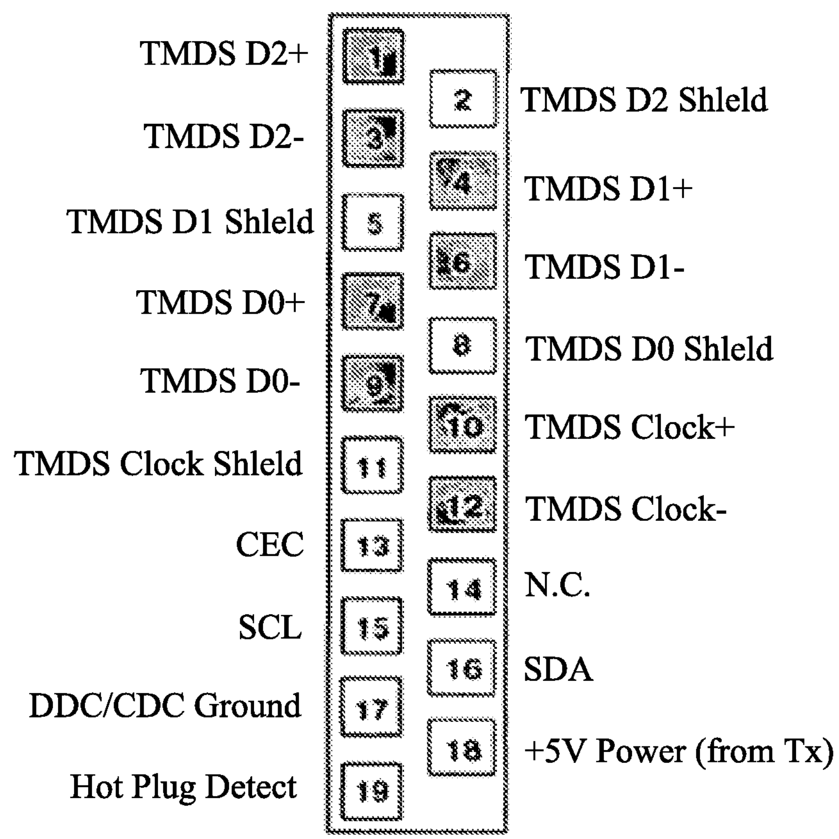
FIG. 1 is a schematic diagram of pins of an HDMI socket.
Figure 2A:
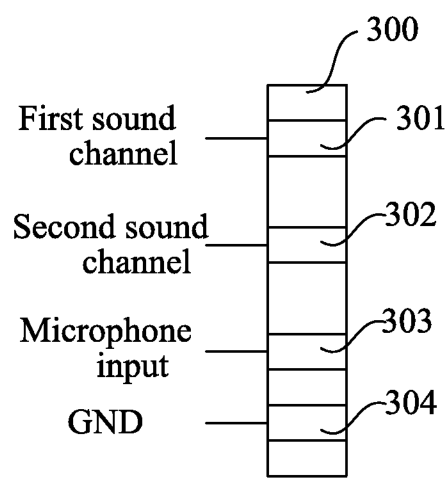
FIG. 2A is a schematic structural diagram of a conventional 4-core headset jack.

The inventors find during the implementation of the present invention that most of the handheld electronic devices have a headset interface currently, and therefore, the headset interface may be considered to be multiplexed into a high-definition video interface. FIG. 2A is a schematic diagram of a headset connector according to the prior art. Currently, common headsets include 3-core headsets or 4-core headsets. FIG. 2A indicates a typical 4-core headset jack. The jack 300 includes four terminals. A first audio terminal 301 is coupled to a first sound channel output of the handheld electronic device. A second audio terminal 302 is coupled to a second sound channel output of the handheld electronic device. A third audio terminal 303 is coupled to a microphone input of the handheld electronic device. In addition, there is a grounding terminal 304 which is grounded. It can be seen that a conventional HDMI needs three pairs of differential transmission lines to transmit high-definition video data, but a headset interface cannot meet the requirements for such number of transmission channels.

Currently, there is a new high-definition video interface called mobile high definition link (MHL) which uses one pair of differential transmission lines to transmit high-definition video data. By multiplexing data complying with the HDMI standards, the MHL uses one channel to transmit data instead of three channels of the HDMI.

Figure 2B:
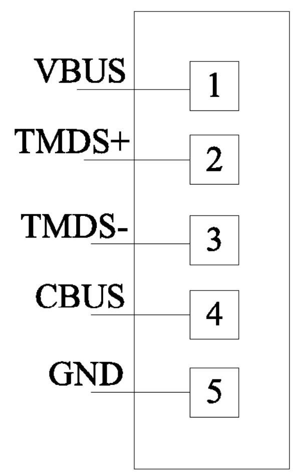
FIG. 2B is a schematic structural diagram of an MHL socket.

FIG. 2B is a schematic diagram of the MHL interface. It can be seen that the MHL interface usually uses five pins, where one pin is connected to a power cable (VBUS), two pins are connected to differential transmission lines (TMDS+, TMDS−), one pin is connected to a control bus (CBUS), and one pin is grounded (GND). The differential transmission lines are configured to transmit high-definition video/audio data, and the power cable is configured to supply power to a device where the MHL interface is located. The control bus is used to transmit some control signals. The inventor finds during the implementation of the present invention that since the MHL just needs one pair of differential transmission lines to transmit high-definition video/audio signals, the multiplexing may be implemented through the headset interface.

In an embodiment of the present invention, a multipurpose connector for multiplexing a headset interface into a high-definition video/audio interface includes a headset connector, a selecting switch, a high-definition video/audio transceiver, and an audio output module, where the headset connector includes a first audio terminal and a second audio terminal, and optionally further includes a grounding terminal. The audio output module is configured to output an audio signal of the headset. The selecting switch includes two lines, where when the selecting switch communicates with a first line, the first audio terminal and the second audio terminal are coupled to a pair of differential transmission lines respectively. The differential transmission lines are configured to transmit high-definition video/audio data output by the high-definition video/audio transceiver. When the selecting switch communicates with a second line, the first audio terminal is coupled to the audio output module. Optionally, when the selecting switch communicates with the second line, the first audio terminal is coupled to an output end of a first sound channel of the audio output module, and the second audio terminal is coupled to an output end of a second sound channel of the audio output module.

In some embodiments of the present invention, the connector further includes an audio input module configured to receive an input signal of the microphone. The headset connector further includes a third audio terminal, where the third audio terminal is coupled to a control bus of the high-definition video/audio transceiver when the selecting switch communicates with the first line, and is coupled to the input end of the audio input module when the selecting switch communicates with the second line.

In some embodiments of the present invention, the first audio terminal is a first sound channel terminal of the conventional headset connector, the second audio terminal is a second sound channel terminal of the conventional headset connector, and the third audio terminal is a microphone terminal of the conventional headset connector. In other embodiments of the present invention, the first audio terminal is the first sound channel terminal of the conventional headset connector, the second audio terminal is the microphone terminal of the conventional headset connector, and the third audio terminal is the second sound channel terminal of the conventional headset connector.

Here, the first sound channel and the second sound channel are different sound channels of the audio output of the handheld electronic device, where the first sound channel and the second sound channel may be a left sound channel and a right sound channel, or a common sound channel and a bass sound channel, which is not limited by the present invention.

In some embodiments of the present invention, the connector further includes a connection detection module which is configured to detect whether the connector is connected to another device. The connection detection module is coupled to the main control unit of the handheld electronic device. When the connection detection module detects that the connector is connected to another device, the main control unit executes a section of program to prompt a user of the handheld electronic device to select the high-definition video/audio connection or the headset connection. The main control unit also executes a section of program to prompt a user of the handheld electronic device to control, according to a selection instruction input by the user, the selecting switch to switch between the first line and the second line.

In some embodiments of the present invention, the connector further includes a device type detection module which is configured to detect a type of a device connected to the connector. When detecting that the connected device is a high-definition video/audio receiving end device, the device type detection module sends a first detection signal to the main control unit. The main control unit controls, according to the first detection signal, the selecting switch to communicate with the first line. When detecting that the connected device is a headset, the device type detection module sends a second detection signal to the main control unit. The main control unit controls, according to the second detection signal, the selecting switch to communicate with the second line.

Figure 3:
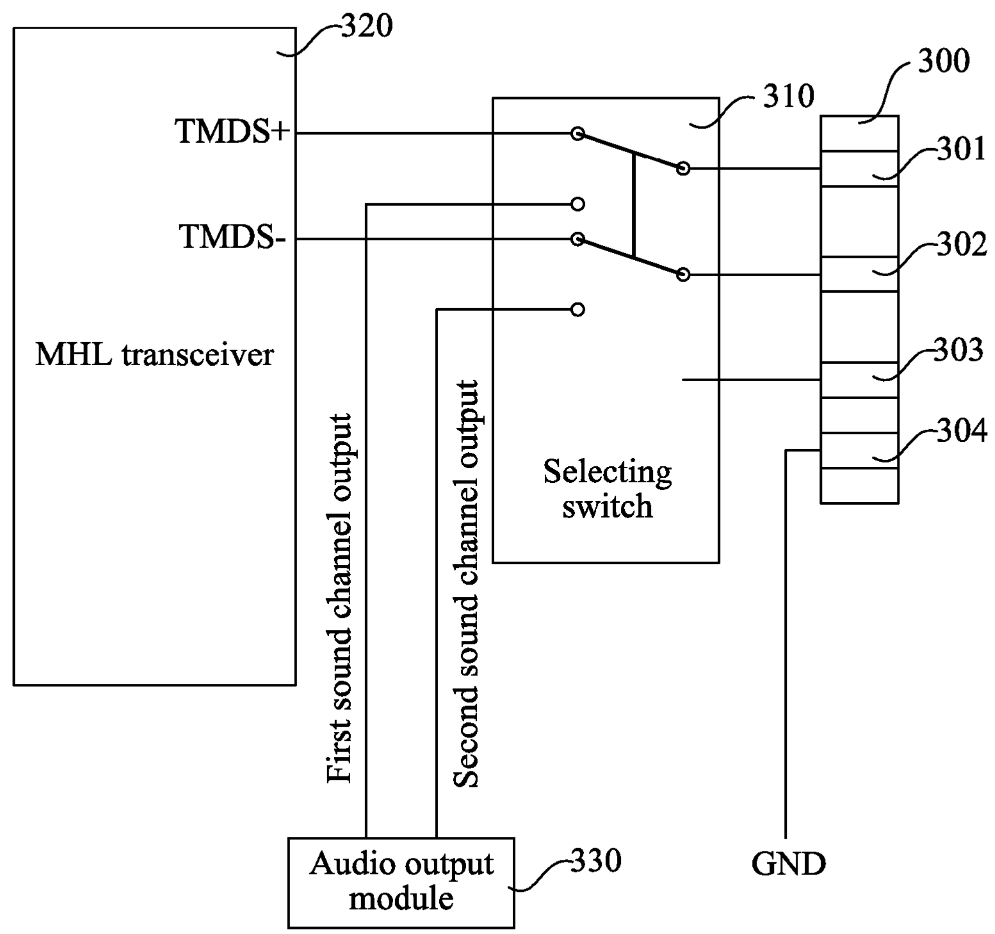
FIG. 3 is a schematic structural diagram of a connector provided in an embodiment of the present invention.

FIG. 3 is a schematic structural diagram of an embodiment of a connector according to the present invention. As shown in the figure, a headset connector 300 includes four terminals: a first sound channel 301, a second sound channel terminal 302, a microphone terminal 303, and a grounding terminal 304. The first sound channel terminal 301 and the second sound channel 302 are connected to a left sound channel and a right sound channel respectively. The microphone terminal is configured to connect a microphone and input an audio signal generated by the microphone.

An MHL transceiver 320 is an element configured to send and receive MHL high-definition video/audio signals. Usually, the MHL transceiver 320 is a chip, for example, SiI9232, SiI9236, SiI9244 series chips, but the embodiments of the present invention are not limited thereto. The function of the MHL transceiver 320 is to convert high-definition video/audio data into the MHL format and transmit, through one pair of differential transmission lines (TMDS+, TMDS−), the foregoing high-definition video/audio data.

A selecting switch 310 is an electronic switch or a mechanical switch, and the switch includes two lines. When the selecting switch 310 communicates with a first line, the differential transmission lines (TMDS+, TMDS−) are coupled to the first sound channel terminal 301 and the second sound channel terminal 302 respectively. When the selecting switch 310 communicates with the second line, the first sound channel terminal 301 and the second sound channel terminal 302 are coupled to an output line of the left sound channel and an output line of the right sound channel respectively. Here, the first sound channel terminal 301 may be coupled to the output line of the left sound channel, and the second sound channel terminal 302 may be coupled to the output line of the right sound channel. Alternatively, the first sound channel terminal 301 may be coupled to the output line of the right sound channel, and the second sound channel terminal 302 may also be coupled to the output line of the left sound channel. The output line of the left sound channel and the output line of the right sound channel are coupled to an audio output module 330.

The audio output module 330 is a module configured to output an audio signal of the headset. Generally speaking, the module includes a digital-to-analog converter (A/D Converter). By converting a digital audio signal received by the audio output module 330 into an analog signal, the audio may be output through a headset interface. Optionally, the audio output module 330 may further include a power amplifier (PA) which is coupled to an output end of the digital-to-analog converter and may amplify the analog signal. The audio output module 330 may output multichannel audio, and an audio signal of each sound channel is corresponding to a transmission line.

Obviously, through the foregoing embodiments, a headset interface may be multiplexed into a high-definition video/audio interface which may transmit high-definition video and audio. Since a size of the headset is small and is equipped on almost every handheld electronic device, a high-definition video/audio interface is achieved on a small size of a handheld electronic device and meanwhile the number of interfaces of the handheld electronic device is not increased.

Figure 4:
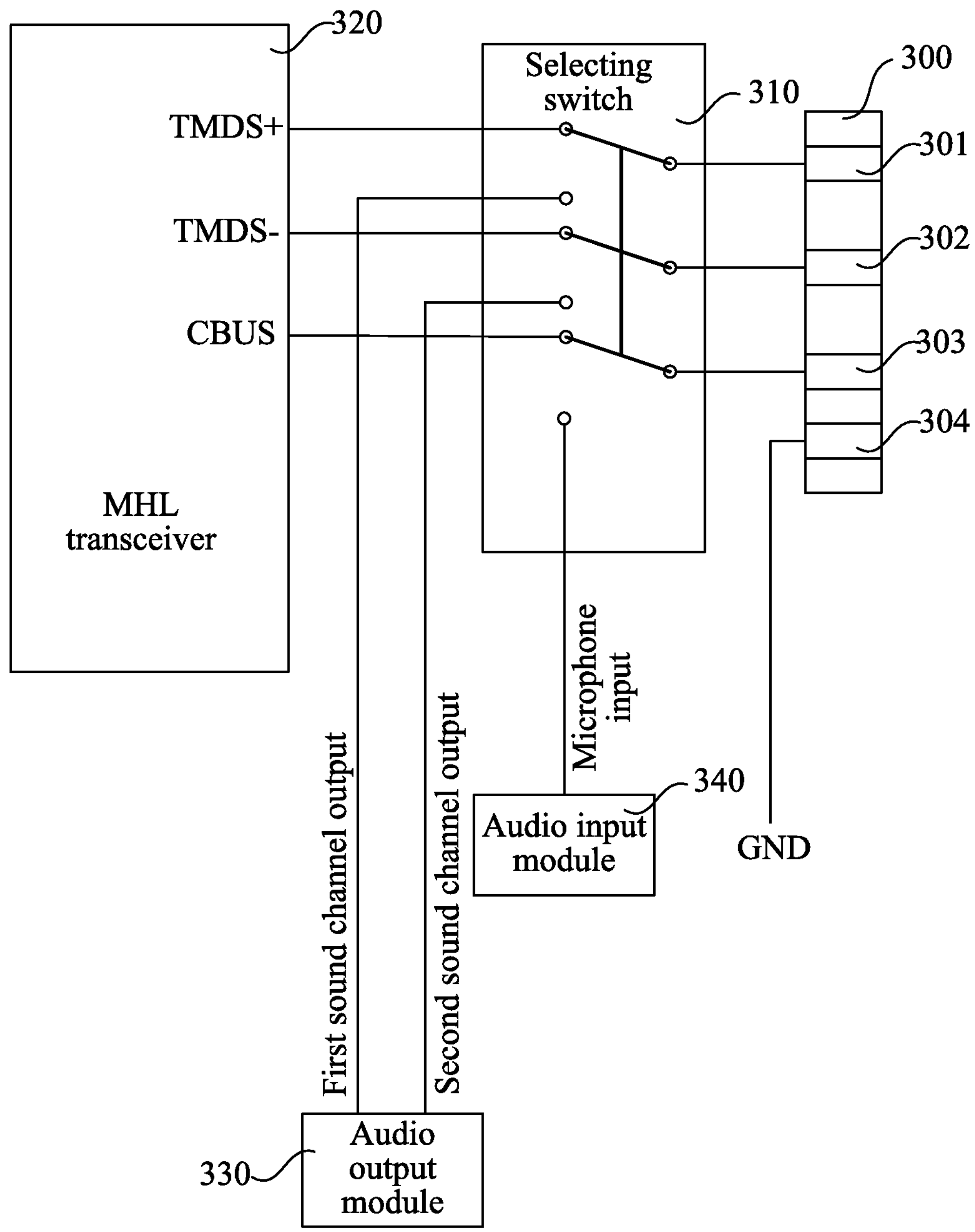
FIG. 4 is a schematic structural diagram of a connector provided in another embodiment of the present invention.

FIG. 4 is a schematic diagram of another embodiment of the connector according to the present invention. Based on the embodiment shown in FIG. 3, when a selecting switch 310 communicates with a first line, a microphone terminal of the headset connector is coupled to an MHL control bus (CBUS). When the selecting switch 310 communicates with a second line, the microphone terminal of the headset connector is coupled to an input line of the microphone and the input line of the microphone is coupled to an audio input module 340.

The audio input module 340 is a module configured to receive an input signal of the microphone. Generally speaking, the module includes an analog-to-digital converter (D/A Converter). By converting an analog signal from the microphone into a digital audio signal, the handheld electronic device may process audio input by the microphone. Optionally, the audio input module 340 may further include a power amplifier (PA) which is coupled to an input end of the analog-to-digital converter and may amplify the analog signal.

In some embodiments of the present invention, the selecting switch 310 communicates with the foregoing first line in a default status, that is, the differential transmission lines (TMDS+, TMDS−) are coupled to a first sound channel terminal 301 and a second sound channel terminal 302 respectively. In other embodiments of the present invention, the selecting switch 310 communicates with the foregoing second line in a default status, that is, the first sound channel terminal 301 and the second sound channel terminal 302 are coupled to the output line of the left sound channel and the output line of the right sound channel respectively.

In some embodiments of the present invention, switching of the selecting switch 310 may be triggered through the following manners.

Figure 11:
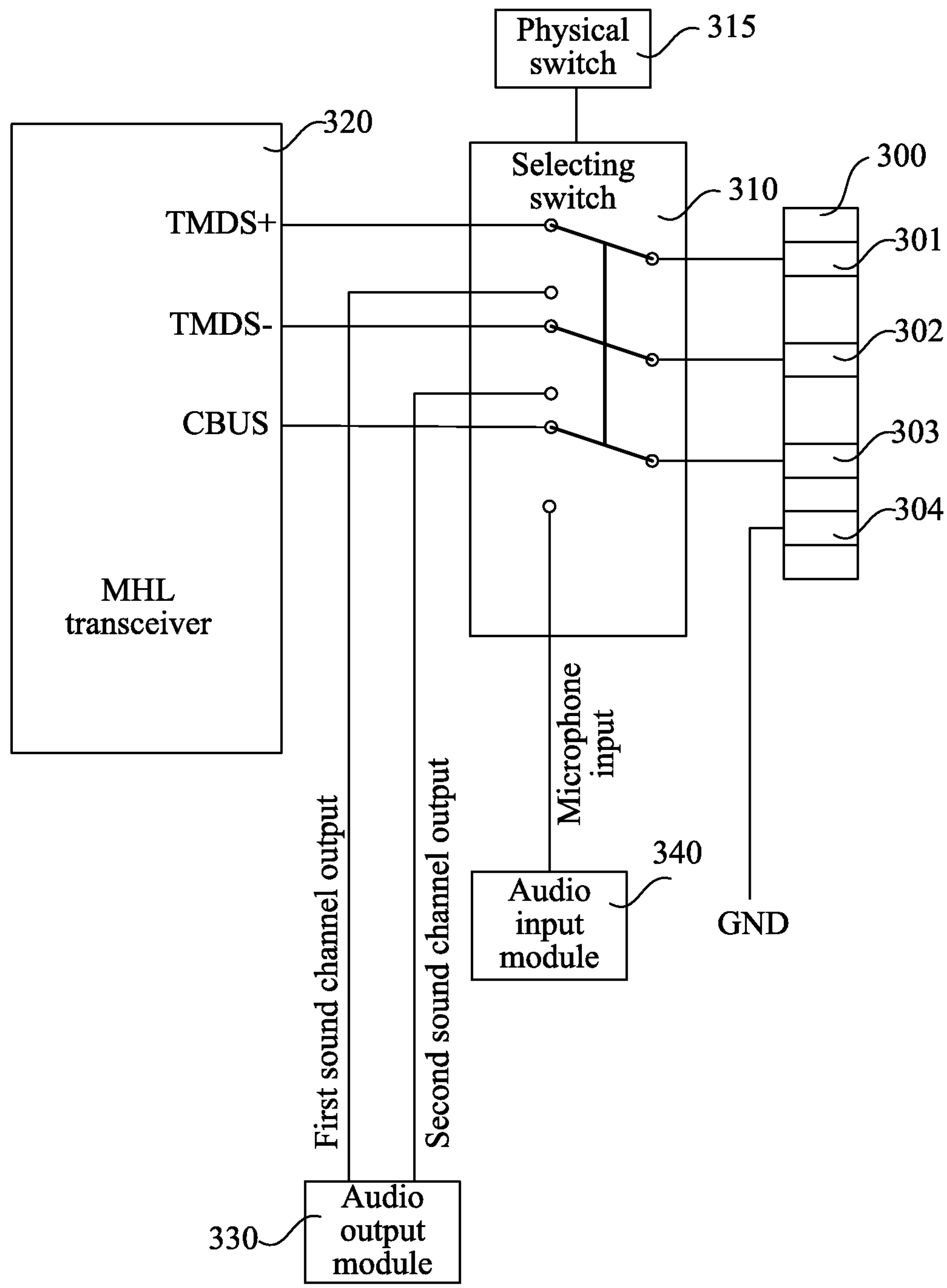
FIG. 11 is a schematic structural diagram of a connector for which switching of a selecting switch is controlled through a physical switch according to an embodiment of the present invention.

1. As shown in FIG. 11, a physical switch 315 may be disposed on the handheld electronic device, and the physical switch 315 may control the switching of the selecting switch 310 between the first line and the second line. As known to persons skilled in the art, the physical switch 315 may control the switching of the selecting switch 310 in a mechanical or electronic manner.

2. The control may be performed through software. Currently, the headset connector of the handheld electronic device usually has an insertion detection function, that is, when a plug is inserted in the headset connector, a signal is generated and transmitted to the main control unit (for example, a central processing unit CPU, a base-band chip, a graphics processing unit and so on) of the handheld electronic device, so that the main control unit senses the insertion of the plug. Specifically, an insertion detection module may be disposed, and is configured to output an insertion detection signal when a plug is inserted in the headset connector. An output end of the module is coupled to the main control unit. When sensing an insertion of the plug, the main control unit executes a section of program to prompt the user of the handheld electronic device to select a headset output or a high-definition video/audio connection. Through an input device of the handheld electronic device, for example, a press key or a touch screen, the user may input a selection instruction to select a headset output or a high-definition video/audio connection. After receiving the selection instruction input by the user, the main control unit controls, according to the selection instruction, the selecting switch 310 to switch between the first line and the second line. For example, the selecting switch 310 may have a control signal input end, and the selecting switch 310 may switch between the first line and the second line according to a control signal input by the input end. The main control unit is coupled to the input end and sends a control signal to the input end.

3. The control may be performed through hardware. An identification circuit may be designed, and the identification circuit is configured to identify a type of a device inserted in the headset connector, so as to control the switching of the selecting unit 310.

The second and third manners are described in detail below.

FIG. 7 is a circuit diagram of a circuit used to perform insertion detection on the headset connector. A section is added to the headset plug, and the section has a dedicated headset insertion terminal PLUGIN. Meanwhile, a pin 5 on the headset socket J1 of the electronic device is changed into a headset insertion pin: PLUGIN. A reed is added between the pin 5 and a pin 6 to detect whether the headset plug PLUGIN is inserted in J1. Furthermore, in the figure, the pin 5 of J1 is connected, through a resistor R47, to a high level: 3.0 V, from the outside. Definitely, persons skilled in the art may understand that the high level herein may be another value.

The specific working principle is described as follows. When PLUGIN on the headset plug is not inserted between the pin 5 and the pin 6 of J1, a CHECK signal is grounded. After PLUGIN of the headset plug is inserted between the pin 5 and the pin 6 of J1, the pin 6 of J1 bounces off. Since the 3.0 V high level performs a high potential pull on the CHECK signal through the resistor R47, the CHECK signal shows a logical high level. Therefore, when the CHECK signal changes from a logical low level to a logical high level, the electronic device thinks that the headset is inserted. In actual application, based on the difference of specific circuit designs, when the headset plug is inserted in J1, the CHECK signal may also change from a logical high level to a logical low level.

Definitely, there are many methods which may be used to perform insertion detection on the headset connector, and the methods are not described one by one herein.

Figure 9:
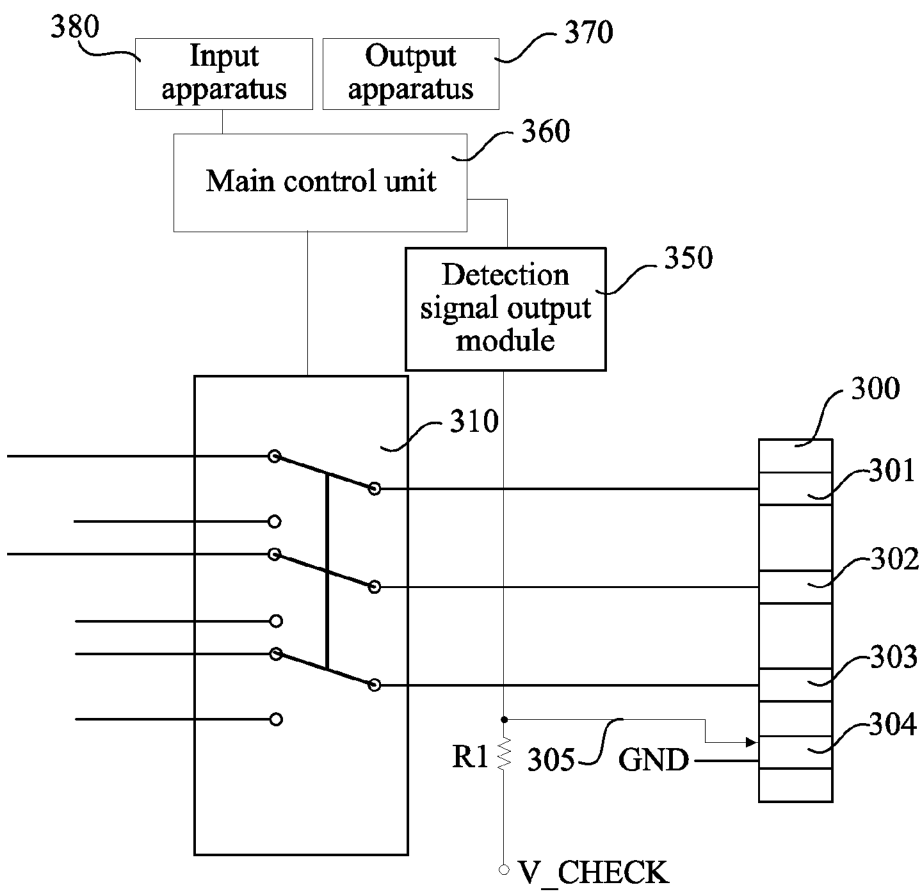
FIG. 9 is a circuit principle diagram of implementing switching of a selecting switch according to an embodiment of the present invention.

As shown in FIG. 9, in an embodiment of the present invention, the headset connector 300 may further include an insertion detection pin 305. The pin is attached to the grounding terminal 304 when no plug is inserted in the headset connector 300, and is disconnected from the grounding terminal when a plug is inserted. It can be implemented by designing the insertion detection pin 305 into a spring piece. When no plug is inserted, the pin presses against the grounding terminal 304. When the plug is inserted, the pin is pushed away by the plug and loses contact with the grounding terminal 304. Definitely, foregoing connection statuses of the insertion detection pin 305 may be achieved through other ways.

The insertion detection pin 305 is optionally coupled to a resistor R1, a bias voltage V_CHECK is applied on the resistor R1, and the insertion detection pin 305 is further coupled to an input end of a detection signal output module 350. When the insertion detection pin 305 is connected to the grounding terminal 304, the detection signal output module 350 is grounded. Therefore, the module detects a potential of approximately 0 V. When the insertion detection pin 305 is disconnected from the grounding terminal, the detection signal output module 350 is connected to the bias voltage V_CHECK through the resistor R1. The bias voltage V_CHECK is usually much higher than a ground potential (0 V), for example, 3 V, and at this time, the detection signal output module 350 may detect a remarkable potential change. Definitely, the bias voltage V_CHECK may also be lower than the ground potential, for example, −3 V.

The detection signal output module 350 is configured to output an insertion detection signal to a main control unit 360. The module may be a simple transistor and buffers a detection signal. The transistor may further provide a necessary level conversion to connect a controller. The module may also be a comparator, for example, a MAX9060 series comparator, and outputs a corresponding detection signal by comparing a detected potential with a reference potential. For example, a low level is output when the detected potential is lower than the reference potential. Otherwise, a high level is output. Generally, when an absolute value of a difference between a first potential and the first bias voltage is smaller than or equal to a first threshold, the detection signal output module outputs an insertion detection signal. The first potential is a potential of a coupling point between an input end of the detection signal output module and the insertion detection pin.

The output end of the detection signal output module 350 is coupled to the main control unit 360. Persons skilled in the art may understand that an input/output (I/O) interface module may be disposed between the detection signal output module 350 and the main control unit 360, so that an insertion detection signal output by the detection signal output module 350 is converted into an interrupt signal of an I/O interface of the main control unit 360 and an interrupt is generated on the main control unit 360.

When receiving the insertion detection signal, the main control unit 360 may execute a section of program to prompt, through an output apparatus 370, a user to select high-definition video/audio output or headset output. The output apparatus 370 may be a screen, for example, the screen displays a dialog box through which the user makes selection, or a speaker which provides a voice prompt. The embodiments of the present invention do not limit thereto.

After that, the user may input his or her selection through an input apparatus 380. The input apparatus 380 receives the output of the user, generates an input signal, and transmits the input signal to the main control unit 360. The input apparatus 380 may be a touch screen, a press key, or a speech input apparatus, which is not limited by the embodiments of the present invention.

An input end of the output apparatus 370 is coupled to the main control unit, and an output end of the input apparatus 380 is coupled to the main control unit 360. Persons skilled in the art may understand that an I/O interface module is usually disposed between the input end of the output apparatus 370 and the main control unit 360, and/or between the output end of the input apparatus 380 and the main control unit 360, so as to convert data generated by the main control unit 360 into a signal which may be identified by the output apparatus 370, or convert an input signal generated by the input apparatus 380 into an interrupt signal of an I/O interface of the main control unit 360.

After receiving the input signal generated by the input apparatus 380, the main control unit 360 outputs a control signal into the selecting switch 310 according to the input signal, so as to control the selecting switch 310 to perform switching.

Figure 6:
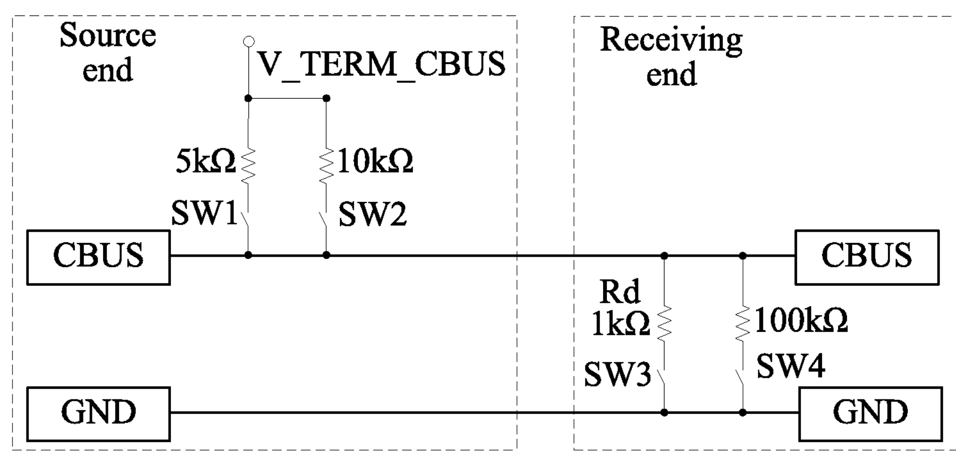
FIG. 6 is a principle diagram for discovering an MHL device.
Figure 8:
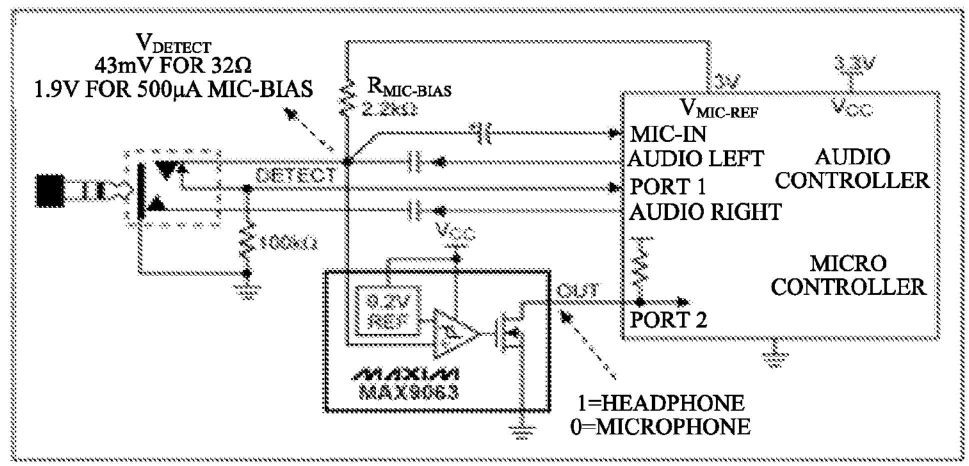
FIG. 8 is a circuit principle diagram of a method for detecting a type of a headset.

For the foregoing third manner, reference is made to FIG. 6. FIG. 6 is a principle diagram for discovering an MHL device. In an initial status, a switch SW3 is closed, that is, at an MHL receiving end, a resistor Rd is connected in series between a control bus CBUS and the ground. In an example shown in FIG. 6, a value of Rd is 1 kΩ, and generally speaking, the value of Rd ranges from 800Ω to 1200Ω. When an MHL source end device is connected, through an MHL connector, to an MHL receiving end device, the MHL source end device first detects impedance on a CBUS line. If finding that the impedance ranges from 800Ω to 1200Ω, the MHL source end device thinks that it has been connected to the MHL receiving end device. Then, the MHL source end device detects whether input occurs on the VBUS shown in FIG. 2B. If there is input, a device discovery process is started. Alternatively, input is not detected on the VBUS for a period, the device discovery process is also started. At the beginning of the device discovery process, the MHL source device sends a string of Wake up and Discovery pulses through the CBUS. After receiving the string of pulses, the MHL receiving end device judges that an MHL source device is connected to itself. At this time, a switch SW4 is connected and a switch SW3 is disconnected. Since the resistance of a resistor which is connected to the ground in parallel on the CBUS becomes 100 kΩ, the CUBS turns into a high level. When detecting the high level, the MHL source end device may judge that the connected device is an MHL receiving end device. At this time, the switch SW1 is connected, the switch SW2 is disconnected, and the MHL device discovery process continues until the discovery process ends.

Figure 5:
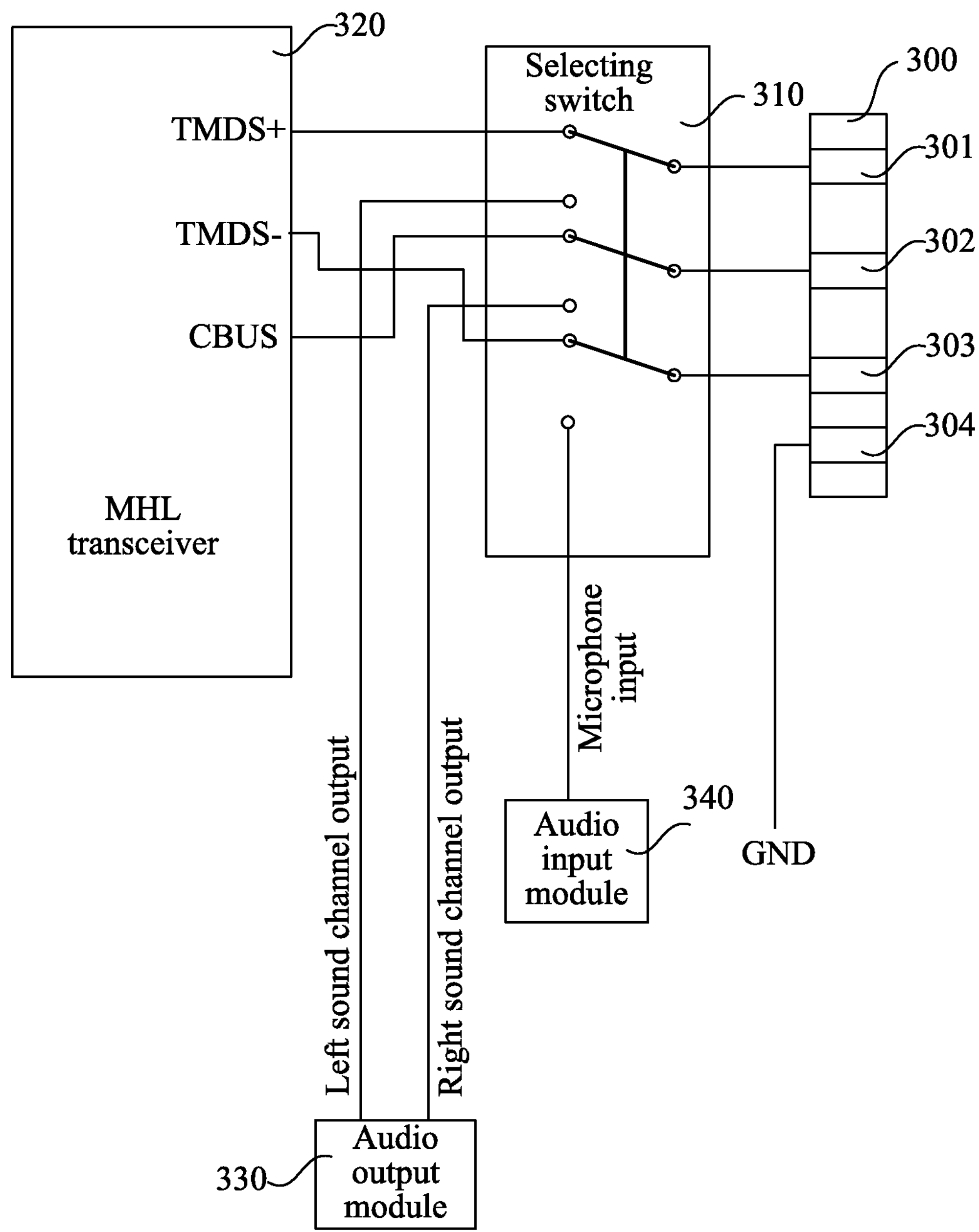
FIG. 5 is a schematic structural diagram of a connector provided in still another embodiment of the present invention.

As seen in the foregoing MHL device discovery process, the initiation of the discovery process depends on the detection of impedance on the CBUS line, and the MHL device discovery process is triggered when the impedance ranges from 800Ω to 1200Ω. However, the impedance of many microphones falls within the range. Therefore, if the CBUS and a microphone use the same terminal, a wrong judgment may occur. The impedance of a headset is usually very small, usually ranging from several tens of ohms or even several ohms. If the CBUS and the headset share a terminal, a wrong judgment may be avoided. That is, the connector may be shown by FIG. 5. When the selecting switch communicates with the first line, the first sound channel terminal 301 and the microphone terminal 303 are coupled to the differential transmission lines, and the second sound channel terminal 302 is coupled to the control bus CUBS. When the selecting switch communicates with the second line, the first sound channel terminal 301 and the second sound channel terminal 302 are coupled to the left sound channel and the right sound channel respectively, and the microphone terminal 303 is coupled to the microphone input.

Figure 10:
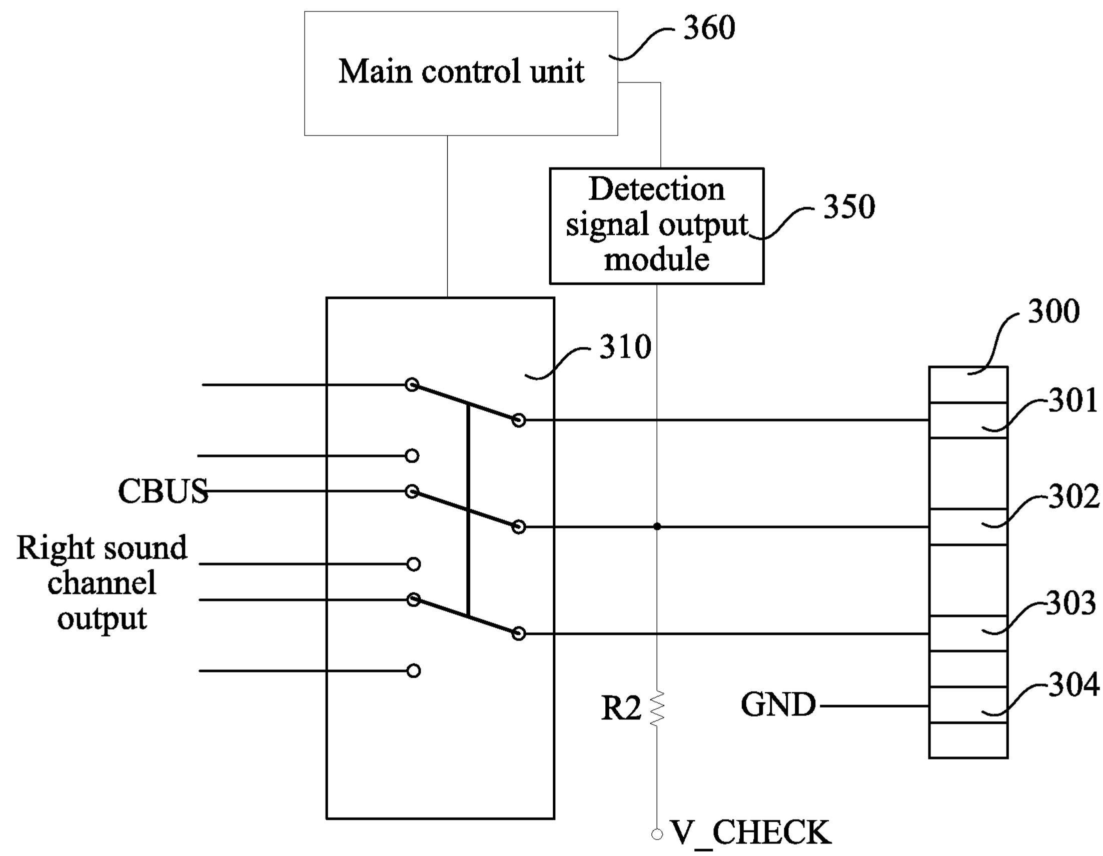
FIG. 10 is a circuit principle diagram of implementing switching of a selecting switch according to another embodiment of the present invention.

As shown in FIG. 10, in an embodiment of the present invention, when the selecting switch 310 communicates with the foregoing first line, the second sound channel terminal 302 is coupled to the MHL control bus (CBUS). When the selecting switch 310 communicates with the foregoing second line, the second sound channel terminal 302 is coupled to the output of the right sound channel (or the left sound channel). The second sound channel terminal 302 is further coupled to a resistor R2, and a bias voltage V_CHECK is applied on the resistor R2. The value of the R2 is usually great, for example, several thousands of ohms. At the same time, the second sound channel terminal is coupled to the detection signal output module 350. When the MHL receiving end device is connected to the headset connector 300, since the second sound channel terminal is connected to the CBUS of the MHL receiving end device at this time and a resistor with a resistance of 800Ω to 1200Ω is connected between the CBUS of the MHL receiving end device and the ground, the detection signal output module 350 may detect that the potential of the second sound channel terminal 302 is high at this time, for example, if R2=1 kΩ, and V_CHECK=3 V, the potential on the second sound channel terminal 302 is approximately 1.5 V. When the headset is connected to the headset connector 300, since the impedance of the headset is very small, the detection signal output module 350 may detect that the potential of the second sound channel terminal 302 is low (usually close to 0 V) at this time. Therefore, it may be judged that the connected device is an MHL receiving end device or a headset according to the obvious change of the potential on the second sound channel terminal. In another alternative embodiment, the value of R2 is very small, for example, several ohms. In this case, when the MHL receiving end device is connected to the headset connector 300, since the second sound channel terminal is connected to the CBUS of the MHL receiving end at this time and a resistor with a resistance of 800Ω to 1200Ω is connected between the CBUS of the MHL receiving end device and the ground, the detection signal output module 350 may detect that the potential of the second sound channel terminal 302 is high at this time, and the value is close to V_CHECK. When the headset is connected to the headset connector 300, since the impedance of the headset is very small, the detection signal output module 350 may detect that the potential of the second sound channel terminal 302 is low at this time, for example, the value is only half of V_CHECK.

The detection signal output module 350 is configured to output an insertion detection signal to a main control unit 360. The module may be a simple transistor and buffers a detection signal. The transistor may further provide a necessary level conversion to connect a controller. The module may also be a comparator, for example, a MAX9060 series comparator, and outputs a corresponding detection signal by comparing a detected potential with a reference potential. For example, a low level is output when the detected potential is lower than the reference potential; otherwise, a high level is output.

Generally, the detection signal output module 350 is configured to output a video detection signal when the impedance on the second audio terminal is first impedance, and output a headset detection signal when the impedance on the second audio terminal is second impedance. Here, a video detection signal indicates that the connected device is a high-definition video/audio device, and a headset detection signal indicates that the connected device is a headset or other audio output devices (for example, a speaker box). Generally, a second bias voltage is applied on the second audio terminal, and a first resistor is connected in series between the second bias voltage and a second coupling point, where the second coupling point is a coupling point of the input end of the detection signal output module and the second audio terminal. The detection signal module is specifically configured to output a first line of detection signals when an absolute value of a difference between a second potential and the second bias voltage is smaller than or equal to a third threshold, and output a second line of detection signals when the absolute value of the difference between the second potential and the second bias voltage is greater than the third threshold. Alternatively, the detection signal module is specifically configured to output a first line of detection signals when an absolute value of a difference between a second potential and the second bias voltage is smaller than or equal to a third threshold, and output a second line of detection signals when the absolute value of the difference between the second potential and the second bias voltage is greater than the third threshold. The second potential is a potential of the second coupling point herein.

The output end of the detection signal output module 350 is coupled to the main control unit 360. Persons skilled in the art may understand that an I/O interface module may be disposed between the detection signal output module 350 and the main control unit 360, so that an insertion detection signal output by the detection signal output module 350 is converted into an interrupt signal of an I/O interface of the main control unit 360 and an interrupt is generated on the main control unit 360.

After receiving a detection signal output by the detection signal output module, the main control unit 360 generates a control signal to control the selecting switch 310 to perform switching. For example, when the detection signal indicates that the device connected to the headset connector is an MHL receiving end device, the selecting switch 310 is controlled to communicate with the first line. When the detection signal indicates that the device connected to the headset connector is a headset, the selecting switch 310 is controlled to communicate with the second line.

Persons skilled in the art may know that the embodiments shown in FIG. 9 and FIG. 10 may be combined.

Persons skilled in the art may understand that the first sound channel terminal, the second sound channel terminal, and the microphone terminal are specific examples of the first audio terminal, the second audio terminal, and the third audio terminal.

Figure 12:
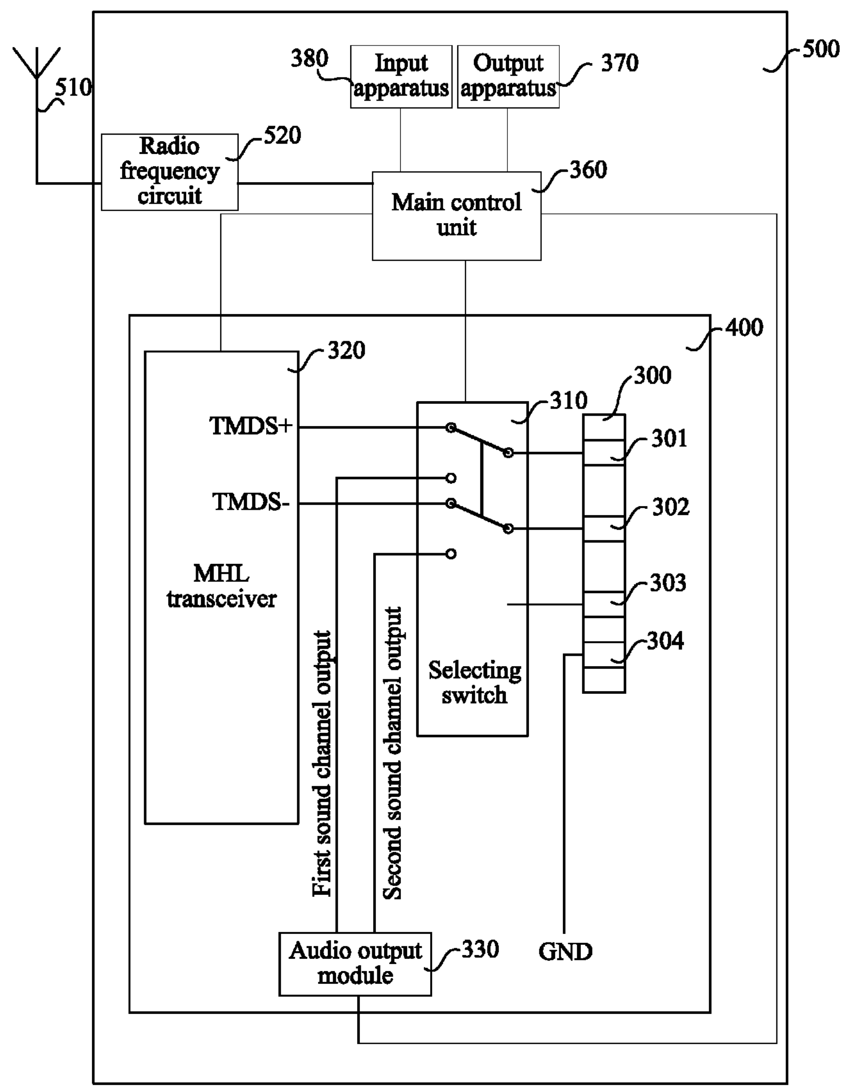
FIG. 12 is a schematic structural diagram of a handheld electronic device provided in an embodiment of the present invention.

As shown in FIG. 12, an embodiment of the present invention further provides a handheld electronic device 500 with the foregoing multipurpose connector 400. The electronic device 500 includes the multipurpose connector 400 and the main control unit 360 described in the foregoing embodiments. The main control unit 360 is coupled to the high-definition video/audio transceiver and the audio output module respectively. Furthermore, the handheld electronic device 500 may further include one or multiple input apparatuses 380 configured to receive input of a user, and an output end of the input apparatus 380 is coupled to the main control unit 360. The input apparatus 380 may be a keyboard, a touch-screen, or a speech input apparatus. The handheld electronic device 500 may further include one or multiple output apparatuses 370, and an input end of the input apparatus 370 is coupled to the main control unit 360. The output apparatus 370 may be a display screen or a speaker. As known to persons skilled in the art, a corresponding interface module is usually disposed between the input apparatus 380, the output apparatus 370, and the main control unit 360. The handheld electronic apparatus 500 may further include one or multiple antennas 510. The antenna 510 is coupled to a radio frequency circuit 520, and is configured to transmit and receive a radio signal, so that the electronic device 500 performs data interaction with the network.

Persons skilled in the art may understand that although the foregoing embodiments are described through an example where a headset interface is multiplexed into an MHL interface, an example is also applicable where the headset interface is multiplexed into another video interface which also uses a pair of differential lines to transmit a video signal like the MHL interface.

In addition, the technologies, systems, apparatus, methods in the foregoing embodiments and technical features respectively described in the embodiments can be combined, so as to form other modules, methods, apparatus, systems and technologies without departing from the spirit and principle of the present invention. The combined modules, methods, apparatus, systems, and technologies according to the record of the present invention should all fall within the protection scope of the present invention.

Apparently, persons skilled in the art should understand that, the foregoing units or steps of the present invention can be implemented by a general-purpose computational apparatus, and can be gathered on a single computational apparatus or be distributed on a network consisting of multiple computational apparatus. Optionally, the units or steps can be implemented through program codes executable by the computational apparatus, so that the program codes can be stored in a storage apparatus to be executed by the computational apparatus, or be implemented by making the units and steps into various circuit modules, or making multiple units or steps thereof into a single circuit module. In the way, the present invention is not limited to any specific combination of hardware and software.

The foregoing descriptions are merely exemplary embodiments of the present invention, but not intended to limit the protection scope of the present invention. Any modification, equivalent replacement, and improvement made within the spirit and principle of the present invention should all fall within the protection scope of the present invention.

What is claimed is:

1. A multipurpose connector for multiplexing a headset interface into a high-definition video/audio input interface, the multipurpose connector comprising:

a headset connector comprising a grounding terminal, an insertion detection pin, a first audio terminal, a second audio terminal, and a third audio terminal;

an audio output module configured to output a first audio signal of the headset;

a selecting switch comprising a first line and a second line, wherein when the selecting switch communicates with the first line, the first audio terminal and the second audio terminal are coupled to a pair of differential transmission lines respectively, and wherein when the selecting switch communicates with the second line, the first audio terminal is coupled to the audio output module;

an audio input module separate from the audio output module and configured to receive a second audio signal of the headset that is separate from the first audio signal, wherein, in response to the selecting switch being in communication with the second line, the first audio terminal is coupled to an output end of a first sound channel of the audio output module, a first one of the second audio terminal and the third audio terminal is coupled to the audio input module, and a second one of the second audio terminal and the third audio terminal is coupled to an output end of a second sound channel of the audio output module;

a high-definition video/audio transceiver, wherein the pair of differential transmission lines is configured to transmit high-definition video/audio data output by the high-definition video/audio transceiver; and an insertion detection module, wherein an output end of the insertion detection module is coupled to a main control unit, and the insertion detection module is configured to output an insertion detection signal when a plug is inserted in the headset connector, wherein an input end of a detection signal output module is coupled to the insertion detection pin;

wherein the insertion detection pin is attached to the grounding terminal when no plug is inserted in the headset connector and is disconnected from the grounding terminal when the plug is inserted, and a first bias voltage is applied on the insertion detection pin;

wherein the detection signal output module is configured to output an insertion detection signal when an absolute value of a difference between a first potential and the first bias voltage is smaller than or equal to a first threshold; and wherein the first potential is a potential of a first coupling point, and the first coupling point is a coupling point between the input end of the detection signal output module and the insertion detection pin.

2. The multipurpose connector according to claim 1, wherein when the selecting switch communicates with the second line, the second audio terminal is coupled to the output end of the second sound channel of the audio output module.

3. The multipurpose connector according to claim 2, wherein the third audio terminal is coupled to a control bus of the high-definition video/audio transceiver when the selecting switch communicates with the first line, and wherein the third audio terminal is coupled to the audio input module when the selecting switch communicates with the second line.

4. The multipurpose connector according to claim 1, wherein, when the selecting switch communicates with the second line, the second audio terminal is coupled to the audio input module.

5. The multipurpose connector according to claim 4, wherein the headset connector further comprises a grounding terminal, wherein the multipurpose connector further comprises a detection signal output module, wherein an input end of the detection signal output module is coupled to the second audio terminal, an output end of the detection signal output module is coupled to a main control unit, and the main control unit is coupled to the selecting switch, wherein the detection signal output module is configured to output a video detection signal when an impedance on the second audio terminal is a first impedance, and output a headset detection signal when an impedance on the second audio terminal is a second impedance, and wherein the main control unit is configured to control, according to the video detection signal, the selecting switch to communicate with the first line, and control, according to the headset detection signal, the selecting switch to communicate with the second line.

6. The multipurpose connector according to claim 5, wherein a second bias voltage is applied on the second audio terminal, and a first resistor is connected in series between the second bias voltage and a second coupling point, wherein the second coupling point is a coupling point between the input end of the detection signal output module and the second audio terminal, wherein the detection signal output module is configured to output a first line of detection signals when an absolute value of a difference between a second potential and the second bias voltage is greater than or equal to a second threshold, and output a second line of detection signals when the absolute value of the difference between the second potential and the second bias voltage is smaller than the second threshold, and wherein the second potential is a potential of the second coupling point.

7. The multipurpose connector according to claim 5, wherein a second bias voltage is applied on the second audio terminal, and a first resistor is connected in series between the second bias voltage and a second coupling point, wherein the second coupling point is a coupling point between the input end of the detection signal output module and the second audio terminal, wherein the detection signal output module is configured to output a first line of detection signals when an absolute value of a difference between a second potential and the second bias voltage is smaller than or equal to a third threshold, and output a second line of detection signals when the absolute value of the difference between the second potential and the second bias voltage is greater than the third threshold, and wherein the second potential is a potential of the second coupling point.

8. The multipurpose connector according to claim 4, wherein the third audio terminal is coupled to a control bus of the high-definition video/audio transceiver when the selecting switch communicates with the first line, and the third audio terminal is coupled to an output end of a second sound channel of the audio output module when the selecting switch communicates with the second line.

9. The multipurpose connector according to claim 1, wherein the multipurpose connector further comprises a physical switch, and wherein the physical switch is configured to control the selecting switch to switch between the first line and the second line.

10. The multipurpose connector according to claim 1, wherein the main control unit is coupled to an output end of an input apparatus, an input end of an output apparatus, and the selecting switch, wherein the input apparatus is configured to receive selection input by a user, output a first selection signal when the input selection indicates that the selecting switch communicates with the first line, and output a second selection signal when the input selection indicates that the selecting switch communicates with the second line, and wherein the main control unit is configured to control, under triggering of the insertion detection signal, the output apparatus to prompt the user to make selection that the selecting switch communicates with the first line or the second line, and control, according to the first selection signal, the selecting switch to communicate with the first line, and control, according to the second selection signal, the selecting switch to communicate with the second line.

11. The multipurpose connector according to claim 1, wherein the high-definition video/audio transceiver is a mobile high-definition link MHL transceiver.

12. A handheld electronic device comprising:

a multipurpose connector comprising:

a headset connector comprising a first audio terminal, a second audio terminal, and a grounding terminal, an audio output module configured to output an audio signal of the headset, a selecting switch comprising a first line and a second line, wherein when the selecting switch communicates with the first line, the first audio terminal and the second audio terminal are coupled to a pair of differential transmission lines respectively, and wherein when the selecting switch communicates with the second line, the first audio terminal is coupled to the audio output module;

a high-definition video/audio transceiver, wherein the pair of differential transmission lines is configured to transmit high-definition video/audio data output by the high-definition video/audio transceiver; and a detection signal output module; and main control unit coupled to the high-definition video/audio transceiver and the audio output module respectively;

wherein an input end of the detection signal output module is coupled at a second coupling point to the second audio terminal, and wherein an output end of the detection signal output module is coupled to the main control unit; and wherein the detection signal output module is configured to output, in response to a second bias voltage being applied through a resistor connected in series between the bias voltage and the second coupling point on the second audio terminal, one of a first line of detection signals and a second line of detection signals according to a relationship between a second threshold and an absolute value of a difference between a second potential and the second bias voltage, and wherein the second potential is a potential of the second coupling point.

13. The handheld electronic device according to claim 12, wherein when the selecting switch communicates with the second line, the first audio terminal is coupled to an output end of a first sound channel of the audio output module, and the second audio terminal is coupled to an output end of a second sound channel of the audio output module.

14. The handheld electronic device according to claim 13, wherein the headset connector further comprises a third audio terminal and the multipurpose connector further comprises an audio input module, wherein the third audio terminal is coupled to a control bus of the high-definition video/audio transceiver when the selecting switch communicates with the first line, the third audio terminal is coupled to the audio input module when the selecting switch communicates with the second line, and the main control unit is coupled to the audio input module.

15. The handheld electronic device according to claim 12, wherein the multipurpose connector further comprises an audio input module, when the selecting switch communicates with the second line, the first audio terminal is coupled to an output end of a first sound channel of the audio output module, the second audio terminal is coupled to the audio input module, and the main control unit is coupled to the audio input module.

16. The handheld electronic device according to claim 15, wherein the headset connector further comprises a grounding terminal, wherein the main control unit is coupled to the selecting switch, wherein the detection signal output module is configured to output a video detection signal when an impedance on the second audio terminal is first impedance, and output a headset detection signal when an impedance on the second audio terminal is second impedance, and wherein the main control unit is configured to control, according to the video detection signal, the selecting switch to communicate with the first line, and control, according to the headset detection signal, the selecting switch to communicate with the second line.

17. The handheld electronic device according to claim 16, wherein the detection signal output module is configured to output the first line of detection signals when the absolute value of the difference between the second potential and the second bias voltage is greater than or equal to the second threshold, and output the second line of detection signals when the absolute value of the difference between the second potential and the second bias voltage is smaller than the second threshold.

18. The handheld electronic device according to claim 16, wherein the detection signal output module is configured to output the first line of detection signals when the absolute value of a difference between the second potential and the second bias voltage is smaller than or equal to the second threshold, and output the second line of detection signals when the absolute value of the difference between the second potential and the second bias voltage is greater than the second threshold.

19. The handheld electronic device according to claim 12, wherein the multipurpose connector further comprises a physical switch, and wherein the physical switch is configured to control the selecting switch to switch between the first line and the second line.

20. The handheld electronic device according to claim 12, wherein the multipurpose connector further comprises an insertion detection module, wherein an output end of the insertion detection module is coupled to the main control unit, and the insertion detection module is configured to output an insertion detection signal when a plug is inserted in the headset connector, wherein the main control unit is coupled to an output end of an input apparatus, an input end of an output apparatus, and the selecting switch, wherein the input apparatus is configured to receive selection input by a user, output a first selection signal when the input selection indicates that the selecting switch communicates with the first line, and output a second selection signal when the input selection indicates that the selecting switch communicates with the second line, and wherein the main control unit is configured to control, under triggering of the insertion detection signal, the output apparatus to prompt the user to make selection that the selecting switch communicates with the first line or the second line, and control, according to the first selection signal, the selecting switch to communicate with the first line, and control, according to the second selection signal, the selecting switch to communicate with the second line.

21. The handheld electronic device according to claim 20, wherein the headset connector further comprises a grounding terminal and an insertion detection pin, wherein the insertion detection pin is attached to the grounding terminal when no plug is inserted in the headset connector and is disconnected from the grounding terminal when the plug is inserted, and a first bias voltage is applied on the insertion detection pin, wherein an input end of the detection signal output module is coupled to the insertion detection pin, wherein the detection signal output module is configured to output the insertion detection signal when an absolute value of a difference between a first potential and the first bias voltage is smaller than or equal to a first threshold, and wherein the first potential is a potential of a first coupling point, and the first coupling point is a coupling point between the input end of the detection signal output module and the insertion detection pin.

22. The handheld electronic device according to claim 12, wherein the high-definition video/audio transceiver is a mobile high-definition link MHL transceiver.

* * * * *